F. W. WEBSTER.
WHIFFLETREE.
APPLICATION FILED APR. 25, 1912.

1,081,353.  Patented Dec. 16, 1913.

Witnesses  Inventor
Philip Terrell  Fred W. Webster
Louise C. Reilly  Geo. W. Sues
 Attorney

UNITED STATES PATENT OFFICE.

FRED WILLARD WEBSTER, OF SPOONER, WISCONSIN.

WHIFFLETREE.

1,081,353.  Specification of Letters Patent.  Patented Dec. 16, 1913.

Application filed April 25, 1912. Serial No. 693,034.

*To all whom it may concern:*

Be it known that I, FRED W. WEBSTER, a citizen of the United States, and a resident of Spooner, in the county of Washburn and State of Wisconsin, have invented certain new and useful Improvements in Whiffletrees, of which the following is a specification, reference being had to the accompanying drawings.

This invention relates to certain new and useful improvements in whiffle-trees, and the object of my invention is to provide a whiffletree including a shock absorbing connection between the whiffle-tree ring, and the whiffletree.

Another object is to provide a whiffle-tree which is yieldingly connected to the double tree, the device being of a simple and durable construction and capable of convenient attachment to a double tree or other suitable securing means.

With these and other objects in view, the present invention consists in the combination and arrangement of parts as will be hereinafter more fully described and finally pointed out in the appended claim, it being further understood that changes in the specific structure shown and described may be made within the scope of the claim without departing from the spirit of the invention.

Figure 1:
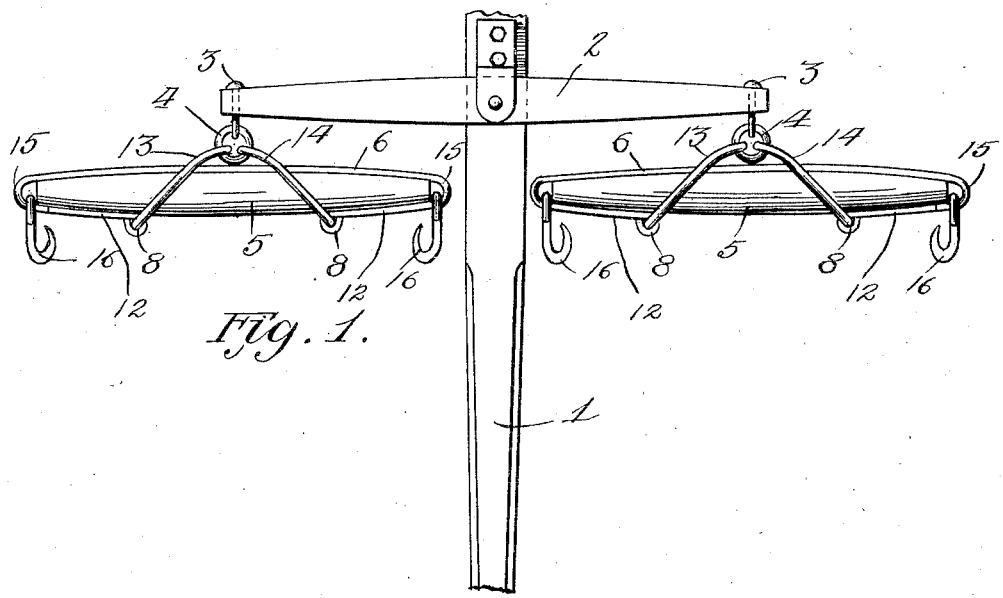
Figure 2:
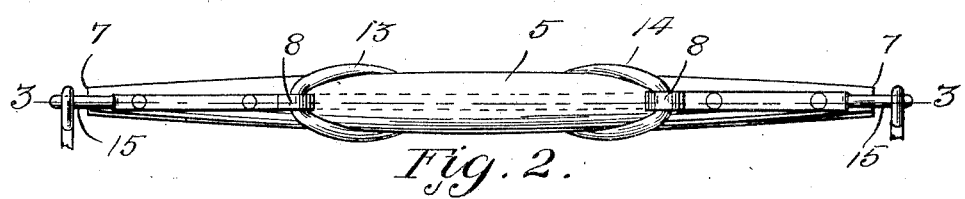
Figure 3:
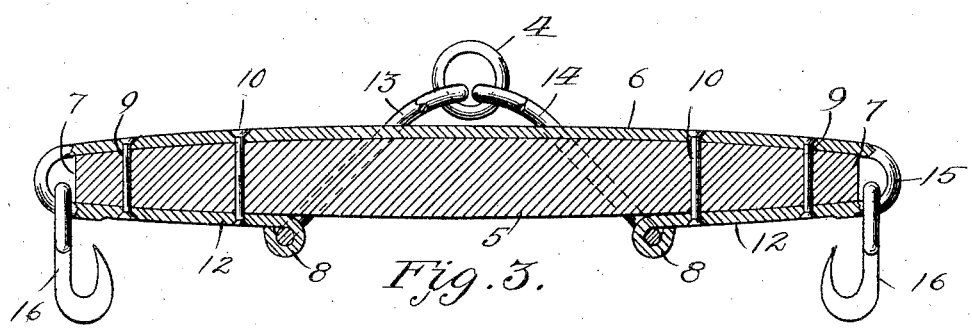

In the accompanying drawings forming a part of this specification and in which like numerals of reference indicate similar parts in the several views: Figure 1, shows a plan view of a broken portion of a wagon tongue and double tree, disclosing two whiffle-trees connected thereto, constructed according to my invention. Fig. 2, shows a forward edge view of a whiffle-tree including my improvement. Fig. 3, is a section on line 3, 3, of Fig. 2.

In my present invention I provide a whiffle-tree so constructed that in starting the vehicle when heavily loaded and when going over obstructions and ruts the shock incident to the temporary stopping of the vehicle will be partly absorbed.

In the drawings the numerals 1, indicates a broken portion of a wagon tongue to which the double tree 2, is secured in the usual manner. This double tree carries the hooks 3, which in turn engage the rings 4, of the swingle trees 5.

In my present invention the swingle tree 5, is reinforced by means of a strap metal member 6, which is secured to the rear edge thereof, as clearly shown in Fig. 3, and has its ends 15, looped over the ends 7, of the whiffle-tree. Each loop portion 15, as shown in Figs. 2 and 3, is rounded while the flat ends 12, of the strap each terminates in an eye 8. As shown in the drawings, these eyes are located approximately one-quarter the distance from the ends of the whiffle tree. The strap metal member 6, as well as the ends 12, are secured to the whiffle-tree 5, by means of the bolts 9 and 10, two such bolts being employed at each end, to secure the reinforcement to the whiffle-tree. As shown in the drawings the rounded ends 15, give support to the swingle tree hooks 16.

Swiveled within the eyes 8, are the two counterpart, resilient, curved or bowed links 13 and 14. These links encompass the whiffle-tree 5, and end at the rear and central portion of the whiffle-tree. Secured to the ends of these bowed links is the ring 4, by means of which the whiffle-tree is secured to a double tree or other suitable hook.

In the use of my swingle tree, every shock or jar imparted to the implement or vehicle to which the swingle tree is connected, is partly absorbed by the yielding bowed links 13 and 14, which makes it easier upon the draft animal than where the connection is rigid. The attachment of the swingle tree to the implement or double tree is effected in any suitable workmanlike manner.

The swingle tree is simple and inexpensive in construction and both durable and efficient in operation.

Having thus described my said invention, what I claim as new and desire to secure by United States Letters Patent is:

The combination with a whiffle-tree, of a strap metal member secured to the rear edge thereof and having its ends looped over the ends of said whiffle-tree each end of said metal member terminating in an eye, said eyes being located approximately one-quarter the distance from the ends of said whiffle-tree, bolts passing through said strap member, whiffle-tree and said ends, a trace hook upon each loop portion of said metal member, a resilient curved link within each eye encompassing said whiffle-tree said curved links ending at the rear and center of said whiffle-tree, and a securing ring engaging said links, as and in the manner set forth.

In testimony whereof I affix my signature, in presence of two witnesses.

FRED WILLARD WEBSTER.

Witnesses:
GEORGE E. STRATTON,
WILLIAM T. CAIRNS.

---

Copies of this patent may be obtained for five cents each, by addressing the "Commissioner of Patents, Washington, D. C."